United States Patent [19]

Beebe

[11] Patent Number: 5,321,628
[45] Date of Patent: Jun. 14, 1994

[54] PROCESS AND APAPRATUS FOR SELECTING TIRES TO REDUCE STEERING PULL AND TIRE SET SELECTED USING SAME

[75] Inventor: James C. Beebe, Kent, Ohio
[73] Assignee: Illinois Tool Works Inc., Glenview, Ill.
[21] Appl. No.: 770,110
[22] Filed: Oct. 2, 1991

Related U.S. Application Data

[63] Continuation-in-part of Ser. No. 556,951, Jul. 23, 1990, Pat. No. 5,229,954.

[51] Int. Cl.$^5$ .......................................... G01M 17/02
[52] U.S. Cl. .................................. 364/508; 364/552; 73/146
[58] Field of Search ............... 364/506, 507, 508, 552; 73/146; 33/203

[56] References Cited

U.S. PATENT DOCUMENTS

| | | | |
|---|---|---|---|
| 4,223,386 | 9/1980 | Maruyama et al. | 364/506 |
| 4,479,382 | 10/1984 | Greenhorn et al. | 73/146 |
| 4,763,515 | 8/1988 | Pielach et al. | 73/146 |
| 4,805,125 | 2/1989 | Beebe | 364/570 |
| 4,817,421 | 4/1989 | Himmler | 73/146 |
| 4,969,355 | 11/1990 | Doi et al. | 73/146 |
| 5,027,649 | 7/1991 | Himmler | 73/146 |

OTHER PUBLICATIONS

"Tire Vehicle Pull: Ply Steer Effects" by Dr. Marion Pottinger presented at the Tire Conference, Oct. 26–27, 1988, Greenville, S.C.
"Tread Design and Belt Angle Effect on Residual Aligning Torque;" SAE paper No. 870423 by Frank E. Matyja (copyright 1987).
"Uniformity of Tire-Wheel Asssemblies," D. J. Schuring, pp. 213–236, Tire Science & Technology, TSTCA, vol. 19, No. 4, Oct.-Dec. 1991; Presented at 9th Annual Meeting of the Tire Society at the University of Akron, Ohio; Mar. 20–21, 1990.

Primary Examiner—Thomas G. Black
Assistant Examiner—Michael Zanelli
Attorney, Agent, or Firm—Ruden, Barnett, McClosky, Smith, Schuster & Russell

[57] ABSTRACT

Tires are measured for a parameter correlated to a tendency to contribute to steering pull when used on a vehicle. A group of the measured tires is then ranked into a successive series by ordering the parameter measurements of the tires in the group non-decreasingly or non-increasingly. A set of at least two tires of substantially consecutive rank are then selected for mounting on the same vehicle in order to reduce steering pull.

39 Claims, 7 Drawing Sheets

FIG. I

| TEST | LEFT FRONT TIRE NBR. | RIGHT FRONT TIRE NBR. | TEST | LEFT FRONT TIRE NBR. | RIGHT FRONT TIRE NBR. | TEST | LEFT FRONT TIRE NBR. | RIGHT FRONT TIRE NBR. |
|---|---|---|---|---|---|---|---|---|
| ☐P01 | 9 | 4 | ☐P31 | 4 | 9 | ☐P61 | 10 | 6 |
| ☐P02 | 1 | 3 | ☐P32 | 3 | 7 | ☐P62 | 5 | 3 |
| ☐P03 | 4 | 8 | ☐P33 | 9 | 10 | ☐P63 | 1 | 9 |
| ☐P04 | 10 | 9 | ☐P34 | 7 | 2 | ☐P64 | 6 | 8 |
| ☐P05 | 4 | 6 | ☐P35 | 8 | 5 | ☐P65 | 5 | 9 |
| ☐P06 | 8 | 3 | ☐P36 | 6 | 2 | ☐P66 | 7 | 10 |
| ☐P07 | 6 | 7 | ☐P37 | 5 | 8 | ☐P67 | 1 | 2 |
| ☐P08 | 10 | 8 | ☐P38 | 7 | 9 | ☐P68 | 3 | 10 |
| ☐P09 | 3 | 9 | ☐P39 | 5 | 6 | ☐P69 | 7 | 1 |
| ☐P10 | 2 | 10 | ☐P40 | 2 | 4 | ☐P70 | 6 | 10 |
| ☐P11 | 5 | 7 | ☐P41 | 9 | 5 | ☐P71 | 8 | 7 |
| ☐P12 | 2 | 6 | ☐P42 | 2 | 7 | ☐P72 | 3 | 4 |
| ☐P13 | 4 | 1 | ☐P43 | 3 | 5 | ☐P73 | 5 | 10 |
| ☐P14 | 9 | 3 | ☐P44 | 4 | 7 | ☐P74 | 3 | 8 |
| ☐P15 | 1 | 6 | ☐P45 | 6 | 1 | ☐P75 | 7 | 6 |
| ☐P16 | 10 | 7 | ☐P46 | 4 | 5 | ☐P76 | 10 | 2 |
| ☐P17 | 2 | 5 | ☐P47 | 1 | 8 | ☐P77 | 1 | 4 |
| ☐P18 | 1 | 7 | ☐P48 | 5 | 4 | ☐P78 | 10 | 5 |
| ☐P19 | 8 | 6 | ☐P49 | 10 | 1 | ☐P79 | 2 | 8 |
| ☐P20 | 10 | 4 | ☐P50 | 9 | 7 | ☐P80 | 3 | 6 |
| ☐P21 | 1 | 5 | ☐P51 | 8 | 4 | ☐P81 | 9 | 2 |
| ☐P22 | 9 | 8 | ☐P52 | 3 | 2 | ☐P82 | 8 | 1 |
| ☐P23 | 3 | 1 | ☐P53 | 6 | 9 | ☐P83 | 2 | 3 |
| ☐P24 | 7 | 4 | ☐P54 | 10 | 3 | ☐P84 | 6 | 5 |
| ☐P25 | 8 | 9 | ☐P55 | 2 | 9 | ☐P85 | 4 | 2 |
| ☐P26 | 6 | 4 | ☐P56 | 4 | 3 | ☐P86 | 6 | 3 |
| ☐P27 | 9 | 1 | ☐P57 | 9 | 6 | ☐P87 | 2 | 1 |
| ☐P28 | 8 | 2 | ☐P58 | 1 | 10 | ☐P88 | 8 | 10 |
| ☐P29 | 4 | 10 | ☐P59 | 7 | 8 | ☐P89 | 5 | 2 |
| ☐P30 | 7 | 5 | ☐P60 | 5 | 1 | ☐P90 | 7 | 3 |

FIG. 6

|     | 1 | 2 | 3 | 4 | 5 | 6 | 7 | 8 | 9 | 10 | Avg |
|-----|---|---|---|---|---|---|---|---|---|----|-----|
| 1   |   | $P_{1,2}$ | $P_{1,3}$ | $P_{1,4}$ | $P_{1,5}$ | $P_{1,6}$ | $P_{1,7}$ | $P_{1,8}$ | $P_{1,9}$ | $P_{1,10}$ | $RA_1$ |
| 2   | $P_{2,1}$ |   | $P_{2,3}$ | $P_{2,4}$ | $P_{2,5}$ | $P_{2,6}$ | $P_{2,7}$ | $P_{2,8}$ | $P_{2,9}$ | $P_{2,10}$ | $RA_2$ |
| 3   | $P_{3,1}$ | $P_{3,2}$ |   | $P_{3,4}$ | $P_{3,5}$ | $P_{3,6}$ | $P_{3,7}$ | $P_{3,8}$ | $P_{3,9}$ | $P_{3,10}$ | $RA_3$ |
| 4   | $P_{4,1}$ | $P_{4,2}$ | $P_{4,3}$ |   | $P_{4,5}$ | $P_{4,6}$ | $P_{4,7}$ | $P_{4,8}$ | $P_{4,9}$ | $P_{4,10}$ | $RA_4$ |
| 5   | $P_{5,1}$ | $P_{5,2}$ | $P_{5,3}$ | $P_{5,4}$ |   | $P_{5,6}$ | $P_{5,7}$ | $P_{5,8}$ | $P_{5,9}$ | $P_{5,10}$ | $RA_5$ |
| 6   | $P_{6,1}$ | $P_{6,2}$ | $P_{6,3}$ | $P_{6,4}$ | $P_{6,5}$ |   | $P_{6,7}$ | $P_{6,8}$ | $P_{6,9}$ | $P_{6,10}$ | $RA_6$ |
| 7   | $P_{7,1}$ | $P_{7,2}$ | $P_{7,3}$ | $P_{7,4}$ | $P_{7,5}$ | $P_{7,6}$ |   | $P_{7,8}$ | $P_{7,9}$ | $P_{7,10}$ | $RA_7$ |
| 8   | $P_{8,1}$ | $P_{8,2}$ | $P_{8,3}$ | $P_{8,4}$ | $P_{8,5}$ | $P_{8,6}$ | $P_{8,7}$ |   | $P_{8,9}$ | $P_{8,10}$ | $RA_8$ |
| 9   | $P_{9,1}$ | $P_{9,2}$ | $P_{9,3}$ | $P_{9,4}$ | $P_{9,5}$ | $P_{9,6}$ | $P_{9,7}$ | $P_{9,8}$ |   | $P_{9,10}$ | $RA_9$ |
| 10  | $P_{10,1}$ | $P_{10,2}$ | $P_{10,3}$ | $P_{10,4}$ | $P_{10,5}$ | $P_{10,6}$ | $P_{10,7}$ | $P_{10,8}$ | $P_{10,9}$ |   | $RA_{10}$ |
| Avg | $CA_1$ | $CA_2$ | $CA_3$ | $CA_4$ | $CA_5$ | $CA_6$ | $CA_7$ | $CA_8$ | $CA_9$ | $CA_{10}$ | GAvg |

FIG. 7

PROCESS AND APAPRATUS FOR SELECTING TIRES TO REDUCE STEERING PULL AND TIRE SET SELECTED USING SAME

CROSS REFERENCE TO RELATED APPLICATION

This is a continuation-in-part application of co-pending, commonly assigned U.S. patent application Ser. No. 07/556,951 filed Jul. 23, 1990 and issued as U.S. Pat. No. 5,229,954 which is expressly incorporated herein by reference in its entirety.

FIELD OF THE INVENTION

The invention relates to the field of reducing steering pull in vehicles. More particularly, the present invention relates to a process and apparatus for selecting sets of tires for use on the same vehicle so as to reduce the tendency of the vehicle to veer to the right or left in the absence of a corresponding steering input from its driver. A further aspect of this invention relates to a set of tires so selected.

BACKGROUND OF THE INVENTION

Structural nonuniformities in vehicle tires can give rise to an undesirable phenomenon known as "steering pull". Steering pull refers to the tendency of a vehicle traveling forward to veer to the right or left in the absence of a corresponding steering input from its driver. Steering pull can be quantified by measuring the magnitude and direction of force which the driver must apply at the perimeter of the steering wheel in one direction or the other in order to keep the vehicle traveling straight ahead.

The steering pull exhibited by a vehicle due to its tires is attributable almost entirely to behavior of the tires mounted on the steering axle. The tendency of a tire on one end of the axle to cause steering pull algebraically adds to or subtracts from the corresponding tendency of the tire on the other end of the axle. In order to illustrate this, it is useful to first note that tires have a pair of opposed sides which are commonly referred to as the "in-side" (or D.O.T. marking side) and the "out-side" (sometimes referred to as the "curb side" or "whitewall side"). Assume for illustration purposes that the tire mounted on the left side of the front axle of a vehicle, such as a passenger car, tends to veer toward its out-side to such a degree that in order to keep the vehicle traveling straight, a 5 ounce clockwise steering pull force must be applied by the driver to the perimeter of the steering wheel of the car. Further assume that the tire on the opposite end of the same axle tends to pull in the opposite direction, i.e., toward the in-side, with a steering pull of the same magnitude. Since the tires are mounted at opposite ends of the axle, each would tend to cause the car to tend to veer leftwardly and, in order to keep the vehicle traveling straight, the driver would have to exert a distinctly noticeable total steering pull of 10 ounces on the steering wheel in the clockwise direction. However, if only one of these tires was replaced with a tire exhibiting the same degree of steering pull but in the opposite direction of its predecessor, i.e., in the same direction as the tire on the opposite end of the steering axle, the driver would not have to exert any force on the steering wheel to keep the vehicle traveling straight ahead. No annoying steering pull would then be apparent to the driver notwithstanding the tendency of each individual tire to cause steering pull.

One technique for reducing steering pull known in the prior art is to use a tire uniformity machine to measure in tires a parameter, such as conicity, known to be correlated to the tendency of an individual tire to contribute to steering pull and to reject any tire whose conicity exceeds a predetermined maximum limit. However, this technique, when practiced alone, is only effective to limit the maximum contribution to steering pull which can be made by a given tire. Moreover, attempts to reduce such maximum contribution by lowering the reject limit on conicity are gained only at the expense of increased numbers of rejected tires thereby decreasing productivity and raising production costs.

As its name implies, "conicity" indicates the tendency of a tire to roll in an arc as would a section of a cone rather than straight ahead as a true cylinder would tend to roll. Conicity can be measured substantially simultaneously with other non-uniformity indicating parameters on a conventional tire uniformity machine and is commonly expressed as an algebraically signed (+ or −) number in units of pounds or Newtons. Conventionally, positive conicity values indicate a tendency to pull toward the out-side of the tire while negative conicity values indicate a tendency to pull to the in-side.

While it is conventional practice to use conicity as an index for steering pull, conicity is not the only parameter known to be correlated to the tendency of a tire to cause steering pull. Some research suggests that steering pull is caused primarily by the aligning moment of the tire (the moment around the radial axis). Papers such as SAE 870423, "Tread Design and Belt Angle Effect on Residual Aligning Torque", by Frank E. Matyja, have shown that there is a correlation between conicity and residual aligning torque which is the aligning torque existing when the tire rolls so as to generate zero lateral force.

Another known technique for reducing steering pull, which can be practiced alone or in combination with the limiting technique just described, is to mark tires with the algebraic sign of their conicities and select only tires of the same algebraic sign for mounting on opposite ends of the steering axle of a given vehicle. As a consequence, the tendency of each tire to cause steering pull detectable at the steering wheel of the vehicle tends to be at least partially cancelled or offset by the opposing action of the tire on the opposite end of the axle. While beneficial, the degree of cancellation achieved using such a system is uncontrolled and substantial variations in steering pull from one set of tires so selected to another can occur.

In view of the foregoing, it is an objective of the invention to provide a process and apparatus for selecting a set of at least two tires for mounting on the same vehicle such that the tires in a given set tend to contribute to steering pull not only in the same direction with respect to each tire, but also with comparable magnitudes so as to achieve significant cancellation of the steering pull sensed by the driver at the steering wheel with greater consistency than has been possible heretofore.

Another objective of the invention is to provide a selection process which, in addition to meeting the foregoing objectives, can be carried out as a continuous process wherein tires or tire/wheel assemblies are continuously taken up to be measured and properly selected sets of same are continuously delivered.

Another objective is to provide such a continuous process and apparatus which can be economically implemented on a production scale and which do not require facilities for physically storing excessive numbers of tires or tire/wheel assemblies in the interval between measuring their individual tendencies to contribute to steering pull and selecting sets thereof.

It is a further objective of the invention to provide a set of tires or tire/wheel assemblies so selected so as to fulfill the foregoing objectives as well as an additional objective.

That additional objective of the present invention is to provide a selection process and apparatus which can be combined with the invention of the parent Ser. No. 07/556,951 application so as to concurrently achieve the advantages thereof in a single, integrated process and apparatus.

Parent U.S. patent application Ser. No. 07/556,951 is directed to a process and apparatus for pairing tires from a given population of tires with wheels from a given population of wheels so as to optimally reduce radial force variation in the resulting population of tire/wheel assemblies. According to that invention, tires and wheels are inspected as individual components by measuring in each a parameter correlated to its tendency to generate vibration in a given direction. Each tire and wheel in respective groups of N tires and N wheels so inspected are then assigned rank designations such as an ordinal number in the range of 1 through N. The rank designations are assigned in order of the values of the parameters measured and thus indicate relative tendency of each given tire and wheel to generate such vibration as compared to the remaining $N-1$ members of its respective group. Tires and wheels of corresponding rank designation are paired for mounting as a tire/wheel assembly. In the tire/wheel assembly, the tire and wheel are oriented with respect to one another so as to minimize the aforementioned vibration. That system however does not address the problem of steering pull.

SUMMARY OF THE INVENTION

The present invention fulfills the above objectives by providing a specially selected set of tires, either mounted on wheels or otherwise, for reducing steering pull in vehicles and further provides a process and apparatus for selecting such sets of tires.

According to the invention, individual tires from a population of tires are measured to determine the magnitude and algebraic sign of a steering pull-indicating parameter, such as conicity or residual aligning torque, correlated to the tendency of each individual tire to contribute to steering pull. While the use of conicity or residual aligning torque alone may reduce steering pull in some vehicles, especially rear-wheel drive automobiles, the steering pull-indicating parameter presently preferred for tires to be used on front-wheel drive automobiles is a composite parameter consisting of a numerically weighted combination of at least two component parameters such as conicity and revolutions of the tire per kilometer traveled (RPK). Suitable numerical weights to be assigned to each component parameter can vary from one automobile model to another and may be determined using a procedure to be described later herein.

Once its steering pull-indicating parameter has been measured, each tire is associated with a group of tires of a limited number, P, and each tire in the group is assigned a unique one out of a successive series of arbitrary pull rank designations. These pull rank designations, which may suitably comprise a successive series of ordinal rank numbers ranging non-decreasingly from 1 through P (or alternatively, non-increasingly from P through 1), are of finite range and the number of them is the same as the number of tires in the group. The pull rank designations are assigned based on the steering pull-indicating parameter measurements by sorting or otherwise ordering the group of tires into a non-decreasing (or non-increasing) order using those measurements as keys. Thus, the pull rank designation assigned to each tire in the group indicates its relative tendency to contribute to steering pull in a particular direction as compared to each of the remaining tires in the group. The other tires in the group are assigned intermediate pull rank numbers in the same fashion. In accordance with the invention, a set consisting of at least two tires having substantially consecutive pull rank numbers is then selected from the group for use with all of the tires in a given set mounted on one and the same vehicle. As used herein and in the claims, the term "consecutive" refers to an uninterrupted succession according to a regularly ordered series and the term "substantially consecutive" refers to such a succession which is uninterrupted to a degree adequate to effect a desired level of steering pull reduction.

Where a set consisting of only two tires is selected, those tires should be mounted on opposite ends of the steering axle of the vehicle since, as noted previously, the tires on the steering axle are the principal contributors to steering pull. However, since tire rotation from one axle to another is often a recommended maintenance procedure, a set consisting of enough tires to accommodate an entire vehicle is preferably selected.

In a first preferred embodiment, tires are continuously taken up one at a time by a uniformity machine which measures a steering pull-indicating parameter correlated to the tendency of each tire to contribute to steering pull when it is used on a vehicle.

Once their respective steering pull-indicating parameters have been measured, the tires are then transferred to a rotary conveyor upon which a group containing a limited number, P, of tires is accumulated. In this and the other preferred embodiments to be described herein, P consists of 24 tires in all.

In this and each of the other preferred embodiments to be described herein, the steering pull-indicating parameter may comprise either a single parameter such as conicity or residual aligning torque or a composite parameter comprising a numerically weighted combination of at least two component parameters. For instance, a composite parameter consisting of the sum of numerically weighted measurements of conicity and RPK may be used.

After a full group of 24 tires has been accumulated, a computer communicating with the uniformity machine then assigns each tire in the group a unique pull rank number ranging from 1 through 24 based on the magnitude and algebraic sign of its steering pull-indicating parameter as compared to those of the remaining $P-1$ (i.e., 23) tires in the group. The tire having the steering pull-indicating parameter of greatest algebraic value is assigned a pull rank number of 1 while the tire whose steering pull-indicating parameter has the smallest algebraic value is assigned a pull rank number of 24. The remaining tires are assigned intermediate pull rank numbers similarly. The computer then selects from the group at least one set of at least two and preferably four tires having pull rank numbers which are at least substantially consecutive and which are preferably consecutive. After removing the selected tires from the group, the steering pull-indicating parameters of four other tires are measured and those tires are transferred to the group to replace those just removed. The group containing the four new tires is then reranked by the computer, another set of tires is selected and removed. The process so repeats continuously.

While the computer can select as a set any tires having substantially consecutive pull rank numbers, a further aspect of the invention contemplates making subsequent selections from offset regions of the pull rank designation range, 1 through P, so as to reduce the possibility that tires of adjacent rank will be characterized by widely-differing steering pull-indicating parameter values. For example, if a set of tires having rank numbers [1, 2, 3, 4] is selected initially, subsequent sets are selected from the regions [9, 10, 11, 12] then [17, 18, 19, 20] then [5, 6, 7, 8] then [13, 14, 15, 16] then [21, 22, 23, 24] then [1, 2, 3, 4] once again and so on.

A second preferred embodiment provides integration with the invention of the parent application by first forming tire/wheel assemblies from tires and wheels paired in accordance with that invention in order to reduce their combined tendency to generate vibration and thereafter selecting sets of those tire/wheel assemblies so as to reduce steering pull. In this second embodiment, tires are fed serially to a tire uniformity machine which, in a single operating cycle, carries out measurements of at least two parameters characterizing each tire. One of these parameters comprises a tire vibration-indicating parameter correlated to the tendency of the tire to generate vibration in a particular direction of interest, such as the radial direction when the tire is used such as a selected harmonic of radial force variation. The other parameter is a steering pull-indicating parameter as described previously. Tires so measured are then accumulated on a rotary conveyor to form a tire group comprising at least N tires where N is a number selected in accordance with the teachings of the parent application and which is not necessarily the same as the number P described earlier. Each of the tires in the tire group are then ranked by a computer according to their tendencies to generate vibration. To do so, the computer assigns each tire in the tire group a unique tire vibration rank number ranging from 1 through N based on the measurements of the aforementioned tire vibration-indicating parameter so as to indicate the relative tendency of each tire in the tire group to generate vibration in the direction of interest as compared to the other $N-1$ tires in the tire group.

While tires are being so measured and ranked, wheels are measured on a wheel uniformity machine for at least a wheel vibration-indicating parameter correlated to the tendency of each wheel to generate vibration in the aforementioned direction of interest. A group of N wheels so measured is then ranked accordingly by the computer upon being assigned a wheel vibration rank number indicating the relative tendency of each wheel in this wheel group to cause vibration as compared to the other $N-1$ wheels in the wheel group. Tires and wheels whose respective tire vibration rank numbers and wheel vibration rank numbers are the same as one another are then selected with the aid of the computer and mounted in a designated mutual orientation to form tire/wheel assemblies. Those tire/wheel assemblies are accumulated on a second rotary conveyor until a tire/wheel assembly group numbering P tire/wheel assemblies is formed.

The tire/wheel assembly group is also ranked by assigning each tire/wheel assembly therein a unique pull rank number ranging from 1 through P. Sets of those tire/wheel assemblies having at least substantially consecutive, and preferably consecutive, pull rank numbers are then selected from the group of the tire/wheel assemblies in a manner analogous to the selection of sets of tires in the first embodiment in order to reduce steering pull when the set is used on a vehicle.

A third preferred embodiment provides an even greater degree of integration with the subject matter of the parent application by providing an apparatus, method and set of tire/wheel assemblies according to which sets of tires and corresponding sets of wheels are selected concurrently to form sets of tire/wheel assemblies which, like those produced according to the second preferred embodiment, exhibit reduced vibration as well as reduced steering pull. In this embodiment, individual tires are measured until a group of $P'$ tires is accumulated on a rotary conveyor. Each of the accumulated tires is assigned respective tire vibration and tire pull rank numbers in the manner described above except that these rank numbers each range from 1 through $P'$ rather than from 1 through N or 1 through P. $P'$ is a number which is equal to one of the aforementioned numbers N or P whichever of the two is greater. A second rotary conveyor contains a correspondingly sized group of wheels which have been measured and assigned wheel vibration rank numbers in the manner described above except that such wheel vibration rank numbers also range from 1 through $P'$ in this embodiment.

For steering pull reduction, a computer then selects from the tire group a set of tires having substantially consecutive pull rank numbers. Then, in order to reduce vibration for each tire in that selected set of tires, the computer selects that wheel from the wheel group whose wheel vibration rank number is the same as the tire vibration rank number of that tire. The computer indexes each rotary conveyor and causing each tire and wheel so selected to be delivered in mating pairs onto a linear conveyor which delivers them to a pairing station. At the pairing station, the tires and wheels are mounted in a designated mutual orientation to form a set of tire/wheel assemblies which will tend to exhibit reduced steering pull as well as reduced vibration when in use.

From the foregoing it can be appreciated that the invention provides an improved process, apparatus and set of tires for reducing steering pull in that sets of tires or tire/wheel assemblies selected using the invention tend to contribute to steering pull not only in substantially the same direction relative the tires but also do so with magnitudes which are comparable. As a result, when such sets of tires are mounted on one or more axles of the same vehicle including its steering axle, cancellation of steering pull is achieved with greater consistency than has heretofore been possible.

The processes and apparatuses of each of the foregoing embodiments are capable of operating in continuous repetitive cycles wherein tires and/or wheels are continuously taken up to be measured and sets of properly selected tires or tire/wheel assemblies are continuously delivered.

As the second and third embodiments illustrate, the invention can also be effectively and economically integrated with the subject matter of the Ser. No. 07/556,951 application so as to concurrently achieve the advantages thereof, including reducing the tendency of tire/wheel assemblies to generate vibration while also providing a process, apparatus and set of tires for reducing steering pull.

These and other aspects and advantages of the invention will become apparent to those of ordinary skill in the art upon review of this document including the claims, the detailed descriptions of the various embodiments and the accompanying drawings wherein like reference numerals designate like items.

BRIEF DESCRIPTION OF THE DRAWINGS

FIG. 6 illustrates an example of a test design useful in defining a composite steering pull-indicating parameter for a particular vehicle;

FIG. 7 illustrates a data array useful in defining the aforementioned composite steering pull-indicating parameter; and FIG. 8 illustrates a multiple linear regression useful in defining the aforementioned steering pull-indicating parameter.

DETAILED DESCRIPTION OF THE INVENTION

First Preferred Embodiment

Figure 1:
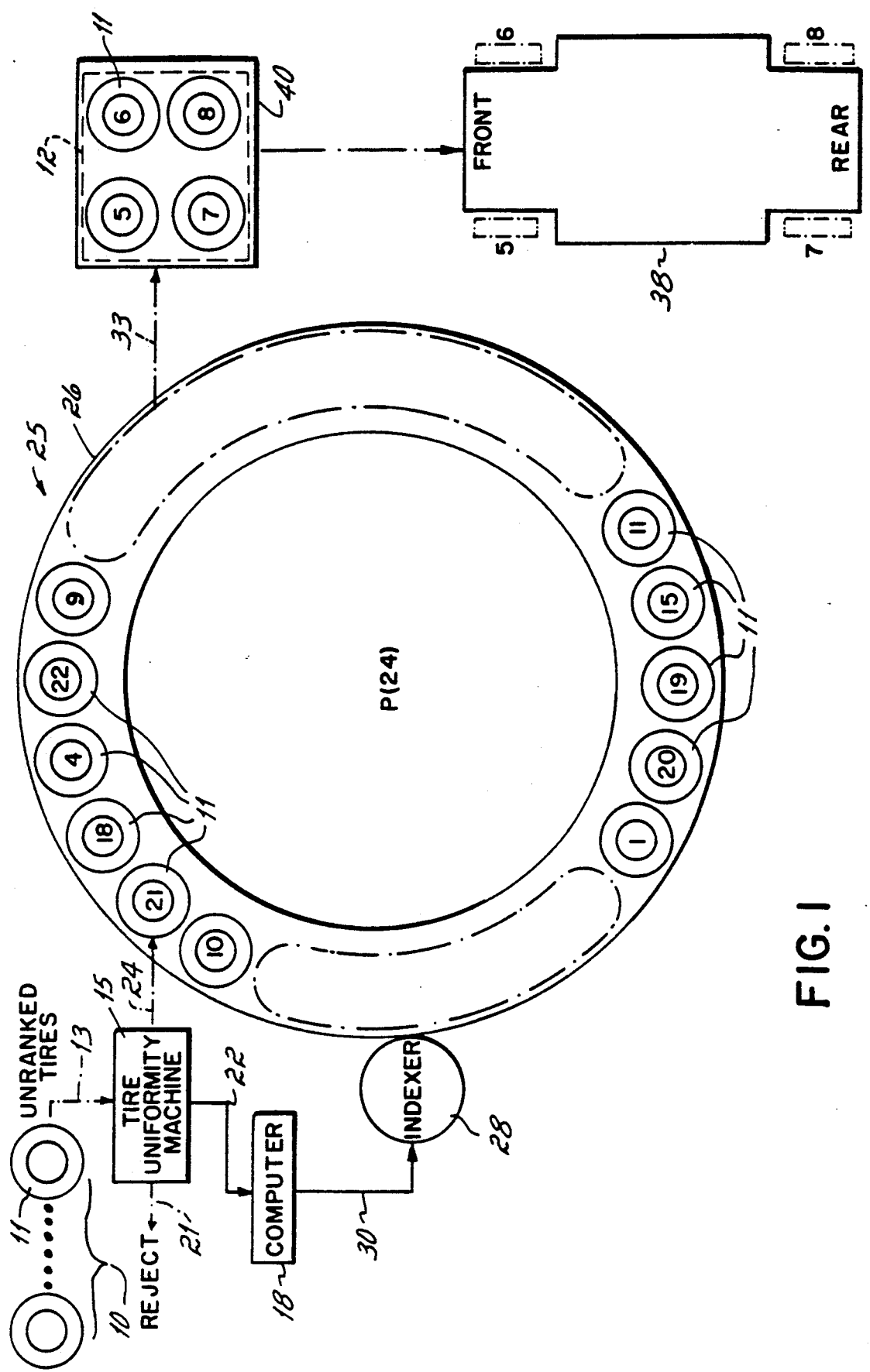
FIG. 1 is a schematic diagram illustrating a first preferred embodiment of the apparatus of the invention.

FIG. 1 shows an unranked population 10 of tires 11 from which sets 12 of tires are to be selected for reducing steering pull in accordance with the invention. Such sets 12 of tires consist of at least two tires intended for mounting on opposite ends of the steering axle of a vehicle and preferably consist of enough tires to accommodate an entire vehicle. For example, where tires 11 are passenger car tires, sets consisting of four (4) tires are preferably selected.

In order that the individual tires 11 making up a group of tires 11 may be ranked as to their respective tendencies to contribute to steering pull, tires 11 are conveyed via a conveyor 13 and taken up one at a time for measuring by a tire uniformity machine 15 which may suitably comprise a Model 70 TUG manufactured by Akron Standard, an ITW Company of Akron, Ohio. Machine 15 measures at least the magnitude of at least one steering pull-indicating parameter, such as conicity, correlated to the tendency of each tire 11 to generate steering pull when it is used on a vehicle. Where the aforementioned parameter is one, such as conicity, which has either a positive or negative algebraic sign indicating direction, machine 15 also determines that algebraic sign. It is believed that other parameters such as residual aligning torque or average effective rolling radius (which may equivalently be expressed in units of revolutions of the tire per unit distance traveled by the tire such as revolutions per kilometer ("RPK")) or combinations of such parameters could alternatively be used as measurable indices of steering pull either in lieu of or in addition to conicity. Selection of a suitable steering pull-indicating parameter consisting of a numerically weighted combination of two or more individual component parameter measurements is described later in this document. Average effective rolling radius or equivalently, RPK, can be measured using the apparatus and method disclosed in U.S. Pat. No. 4,479,382 to Greenhorn et al. which is also expressly incorporated herein by reference in its entirety.

Upon measuring each tire 11, machine 15 generates and transmits, via a signal 22, to a computer 18 for temporary storage in its memory (not shown) information indicating the magnitude and algebraic sign of the aforementioned steering pull-indicating parameter. Optionally, machine 15 can carry out other conventional tire uniformity measurements and, as indicated at 21, reject any tires which do not meet predetermined standards. For instance, tires 11 whose steering pull-indicating parameter and/or other measured parameters of interest, such as radial force variation or selected harmonics thereof, exceed specified reject limits can optionally be rejected.

Once so measured, each non-rejected tire 11 is delivered via a conveyor 24 to one of a plurality of identifiable locations in an accumulator or queue 25 wherein that tire is temporarily physically stored among a plurality of other tires 11 which have previously been measured in the same manner. As illustrated, queue 25 may conveniently take the form of a rotary table 26 whose angular position can be adjusted by means of a conventional mechanical indexer 28 in response to a signal 30 generated by computer 18 so that computer 18 can track the location of each particular tire 11 present on rotary table 26. In accordance with the invention, tires 11 are continuously tested one-by-one by machine 15 and delivered to rotary table 26 until a group containing a total predetermined number, P, of tires is accumulated on table 26. Selection of the number P will be described in further detail hereinafter. For present purposes, it is sufficient to note that in the preferred embodiment, P is selected as twenty-four (24).

Once a full group of P tires is accumulated on rotary table 26, computer 18 ranks the group by assigning each tire 11 present thereon a unique one out of a series of P pull rank designations having predetermined successive order. Such pull rank designations may conveniently comprise a series of consecutive ordinal pull rank numbers ranging from 1 through P in non-decreasing numerical order. The pull rank number of each tire 11 newly delivered to queue 25 from the remainder of population 10 is assigned by computer 18 based on the magnitude and algebraic sign of the steering pull-indicating parameter as measured by machine 15 for that particular tire in relation to those of the remaining P−1 tires 11 present on rotary table 26.

To do so, computer 18 sorts all the tires 11 then physically present in queue 25 (i.e., on table 26) using as keys the aforementioned steering pull-indicating parameter measurements characterizing each respective tire 11 present therein. While such sorting could be carried out by programming computer 18 to physically arrange the tires 11 on rotary table 26 such that tire 11 having consecutive pull rank designations were placed physically next to one another, such physical arranging is unnecessary. More preferably, such sorting is carried out electronically by computer 18. To do so, computer 18 sorts the stored records of the magnitudes and algebraic signs of the pull-indicating parameter as measured for each tire 11 in queue 25 into non-decreasing or nonincreasing order. Computer 18 then assigns each tire 11 in queue 25 an ordinal pull rank number based on the outcome of the sorting and keeps track of the physical location of each tire 11 on rotary table 26 and its associated pull rank number.

In the present embodiment for example, the tire having the greatest tendency to pull toward the in-side direction is assigned the lowest pull rank number and the tire having the greatest tendency to pull in the outside direction is assigned the highest pull rank number. The other tires in the group are assigned intermediate pull rank numbers accordingly. For illustration purposes in FIG. 1, the center portion of each tire 11 shown in queue 25 is marked with a pull rank number. It is to be understood, however, that the pull rank numbers need not be physically marked on wheels 11. All that is required is that computer 18 store the pull rank numbers and track the physical location of each wheel in queue 25. The latter task can conveniently be accomplished in open-loop fashion by driving indexer 28 with drive signal 30 of a digital nature generated by computer 18 so that computer 18 can position rotary table 26 in accordance with a series of digital commands, each of which corresponds to a unique angular orientation. Alternatively, computer 18 could track the location and pull rank number of each tire 11 in queue 25 using conventional position feedback techniques by monitoring the angular position of rotary table 26 with the assistance of a shaft encoder or other suitable position transducer and making an electronic record of the particular position at which each tire 11 on rotary table 26 is located.

The number P should be as small as possible for best-economy of implementation yet large enough to ensure to a desired low level of probability that tires in queue 25 having substantially consecutive pull rank numbers will differ as to their respective tendencies to contribute to steering pull by any more than a limit expected to give rise to a steering pull force deemed to be objectionable for a given application. If the value of P selected is too small, tires of substantially consecutive rank in queue 25 will differ as to their respective tendencies to cause steering pull by an amount sufficient to give rise to objectionable steering pull with unacceptable frequency. On the other hand, performance of the invention in mitigating steering pull will not suffer if P is selected to be too great a value. Selecting the number P to be equal to about twenty-four (24) is presently considered best for passenger car tire applications.

In accordance with the invention, computer 18 selects from the group of P tires accumulated in the queue 25 present on rotary table 26 at least one set 12 of tires 11 having pull rank numbers which are at least substantially consecutive and which are preferably consecutive such as: [1, 2, 3, 4], [5, 6, 7, 8] or [21, 22, 23, 24] where the pairs of brackets define the pull rank numbers of the tires 11 present in a given set 12. By generating a series of appropriate positioning command signals 30, computer 18 then causes indexer 28 to rotate rotary table 26 to the angular positions appropriate to position each tire 11 in the selected set 12 adjacent an off-loading conveyor 33 which, when activated by an appropriate signal (not shown) from computer 18 removes the selected tires 11 from rotary table 26 and delivers them as a set 12. The selected set 12 of tires 11 may be mounted upon wheels and thereafter mounted upon a vehicle 38. At least two of the tires from the selected set 12 should be mounted on the steering axle of vehicle 38. Preferably, the tires 11 mounted on the steering axle should be ones having consecutive pull rank numbers if possible. In cases where a selected set 12 of tires 11 cannot be immediately mounted upon a vehicle, the set 12 should be packaged or stored in a way which permits the integrity of the set to be maintained. This can be conveniently accomplished by storing each set 12 in a single layer or compartment on a pallet or other suitable container 40. Such pallet or container 40 may include multiple layers or compartments so as to be capable of containing a plurality of sets 12.

After a set 12 of four or other desired number of tires 11 is removed from queue 25, the resulting vacancies on rotary table 26 are filled by measuring the aforementioned steering pull-indicating parameter characterizing each of a corresponding number of tires 11 from population 10 using machine 15 and transferring those tires 11 to rotary table 26 in the manner described previously. Once queue 25 is again restored to its full compliment of P tires, computer 18 then re-ranks the tires in queue 25 by assigning a new pull rank number or other designation to each tire 11 therein in the manner described previously. Thereafter, an additional set 12 of tires 11 is selected by computer 18, off-loaded from rotary table 26 and ultimately mounted on a vehicle 38, all in the manner just described. The above operation normally repeats continuously for so long as desired or until all the tires 11 making up population 10 have been exhausted.

In accordance with a further aspect of the invention, subsequent sets 12 of tires 11 are selected from regions of the pull rank designation range which are offset from the regions thereof from which previous sets have recently been selected. This helps to reduce the possibility that tires having consecutive or substantially consecutive pull rank designations will exhibit widely differing tendencies to contribute to steering pull. An additional benefit is to reduce the number P of tires required to be accumulated in queue 25 to achieve a desired level of performance or, alternatively, to increase the performance of the invention achievable using a queue 25 of a given finite tire capacity.

In the present embodiment, this is accomplished by selecting sets of tires in a rotating sequence such as [1, 2, 3, 4] then [9, 10, 11, 12] then [17, 18, 19, 20] then [5, 6, 7, 8] then [13, 14, 15, 16] then [21, 22, 23, 24] then [1, 2, 3, 4] once again and so on where the numbers in brackets correspond to the pull rank numbers of the tires in a selected set 12. Thus, successive set selections are preferably spaced or offset from one another in the range of pull rank designations by a series of rank designations. This spacing or offset from one selected set 12 to another should be equal to at least the number of pull rank designations corresponding to one full set of tires. In the preferred sequence above for example, the set of tires corresponding to pull rank numbers 1, 2, 3 and 4 is separated by four pull rank numbers, i.e., 5, 6, 7 and 8, from the next set selection which includes pull rank numbers 9, 10, 11 and 12.

Further according to the invention, selection sets 12 of tires 11 whose pull rank designations would normally form a successive series of pull rank numbers are offset from one another by at least a portion of the pull rank designation range. Preferably, consecutive set selections are separated from one another along the range of pull rank designations by at least one and preferably two or more complete sets of successive intervening pull rank designations. For example, sets [1, 2, 3, 4] and [5, 6, 7, 8] form a successive series of rank numbers. However, in the preferred embodiments, those two selections are separated by two intervening selections, namely [9, 10, 11, 12] and [17, 18, 19, 20].

Figure 2:
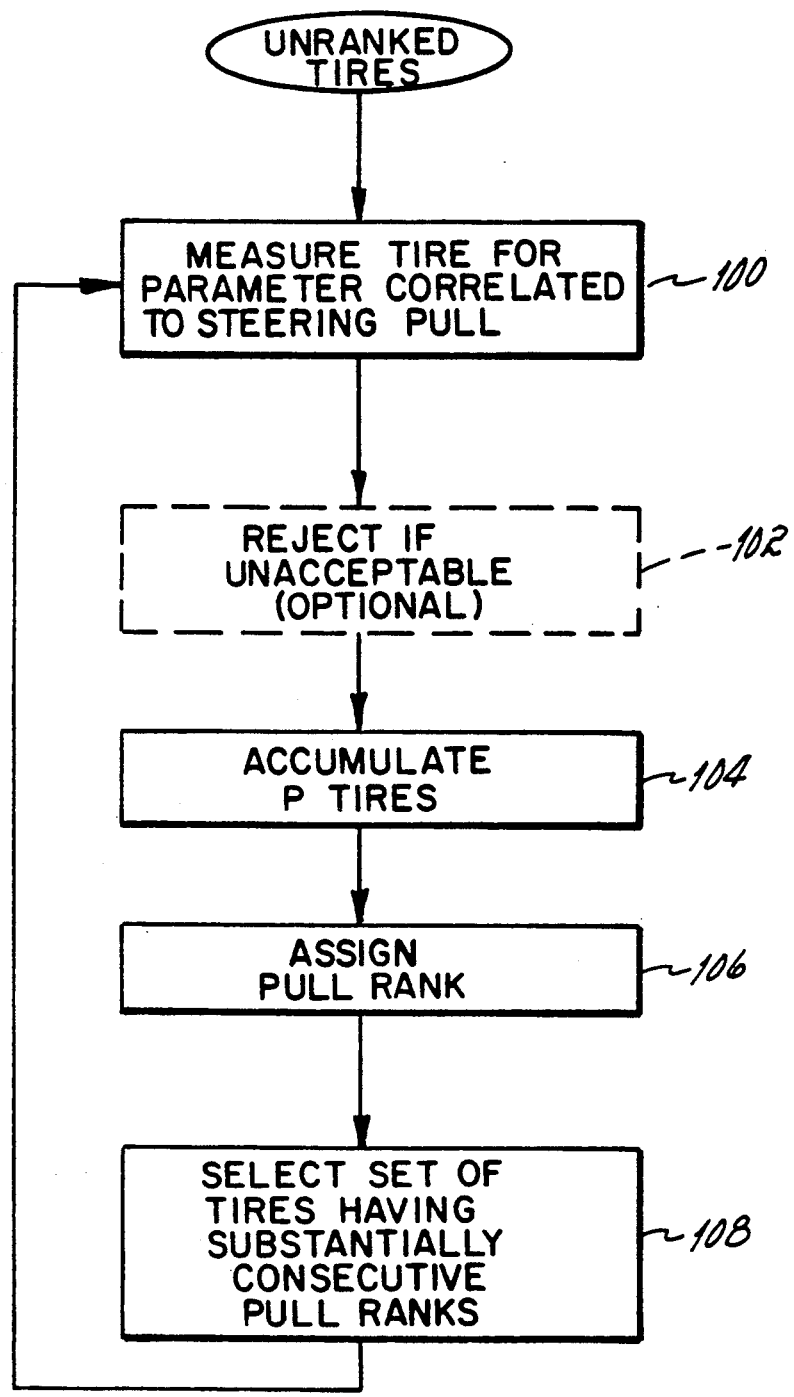
FIG. 2 is a flow diagram illustrating the operation of the embodiment of FIG. 1 as an example of the process of the invention.

The operation of the first preferred embodiment of FIG. 1, which illustrates an important process of the invention, may be summarized with additional reference now to FIG. 2. As indicated at step 100, the steering pull-indicating parameter characterizing unranked tires 11 from population 10 is measured using machine 15 or other suitable means in order to quantify the tendency of each individual tire 11 to contribute to steering pull. In an optional step 102, any tires in which the aforementioned steering pull-indicating parameter or some other parameter of interest measured concurrently with step 100 or at any other time exceeds a predetermined maximum limit are rejected. Step 100 and optional step 102 are carried out repetitively until, as indicated step 104, a group of P nonrejected tires 11 is accumulated in a queue 25 on rotary table 26. Thereafter, at a step 106, each of the P tires in the group is assigned a unique pull rank designation based on the value of the steering pull-indicating parameter measured in step 100 as compared with the corresponding steering pull-indicating parameter measurements of the remaining tires in the group. In a step 108, computer 18 then selects at least one set 12 of at least two and preferably four tires 11 having consecutive or substantially consecutive pull rank numbers. The tires 11 making up the selected set 12 are then removed from the rotary table 26 via off-loading conveyor 33 and are subsequently mounted on at least the steering axle of the same vehicle 38 in order to reduce steering pull. Where the vehicle 38 is not available at the same facility whereat the selection step 108 is carried out, selected sets 12 of tires 11 are preferably packed for transport and/or storage using a suitable pallet or container 40 which maintains the integrity of each set 12.

After the selected set 12 is removed from queue 25, computer 18 deletes from its memory the stored steering pull-indicating parameter measurements for the selected set only and the continuous operating cycle of the invention resumes at step 100. Additional unranked tires 11 from population 10 are measured by machine 15 as described above. If the tires are not rejected in optional step 102, their respective steering pull-indicating parameter measurements are stored in memory by computer 18 and the non-rejected tires 11 are transferred to rotary table 26 until a full group of P tires is once again accumulated there. At step 106, computer 18 then assigns a new pull rank designation to each of the P tires in the accumulated group by sorting or otherwise ordering the stored steering pull-indicating parameter measurements, including those taken of the tires 11 added to rotary table 26 to replenish the aforementioned group, into non-decreasing or non-increasing order and assigning each tire a unique one of the series of P successive pull rank designations according to a corresponding non-decreasing or non-increasing order. Step 108 is then carried out once again with a new set 12 of tires 11 being selected from the re-ranked group of P tires. After the selected set 12 has been removed from the group for use on a vehicle, operation again resumes at step 100 and continues indefinitely according to the basic sequence of steps just described.

In accordance with a further aspect of the invention, the pull rank numbers of each selected set 12 are preferably offset in the range of pull rank numbers from the pull rank numbers of the set 12 selected immediately prior thereto by at least one set of pull rank numbers. Further, according to the invention, each presently selected set 12 consists of tires 11 whose corresponding pull rank numbers are ones whose consecutive predecessors in the predetermined order of pull rank designations were selected at least two selections prior to the presently selected set. For example, where sets of four tires are selected and a presently selected set 12 of tires is one including pull rank numbers [5, 6, 7, 8] as illustrated in FIG. 1, any set 12 containing tires ranked [1, 2, 3, 4] would have been selected at least two selections prior to the presently selected set. As noted previously, this reduces the probability that tires having substantially consecutive pull rank numbers will have steering pull-indicating parameters which vary by an amount sufficient to give rise to an objectionable level of steering pull if those tires are mounted on opposite ends of the steering axle of the same vehicle.

Second Preferred Embodiment

An integrated process and apparatus for reducing steering pull while also reducing the tendency of a tire/wheel assembly to generate vibration as well as a set 54 of tire/wheel assemblies 41 selected in accordance therewith will now be described with reference to FIG. 3. Briefly stated, in accordance with this second embodiment of the invention, tires 11 and wheels 43 are measured and paired in the manner described in the Ser. No. 07/556,951 application so as to reduce vibration. Thereafter, sets 54 of tire/wheel assemblies 41 made from tires 11 and wheels 43 so paired are selected in accordance with the principles of the present invention so as to reduce steering pull.

Figure 3:
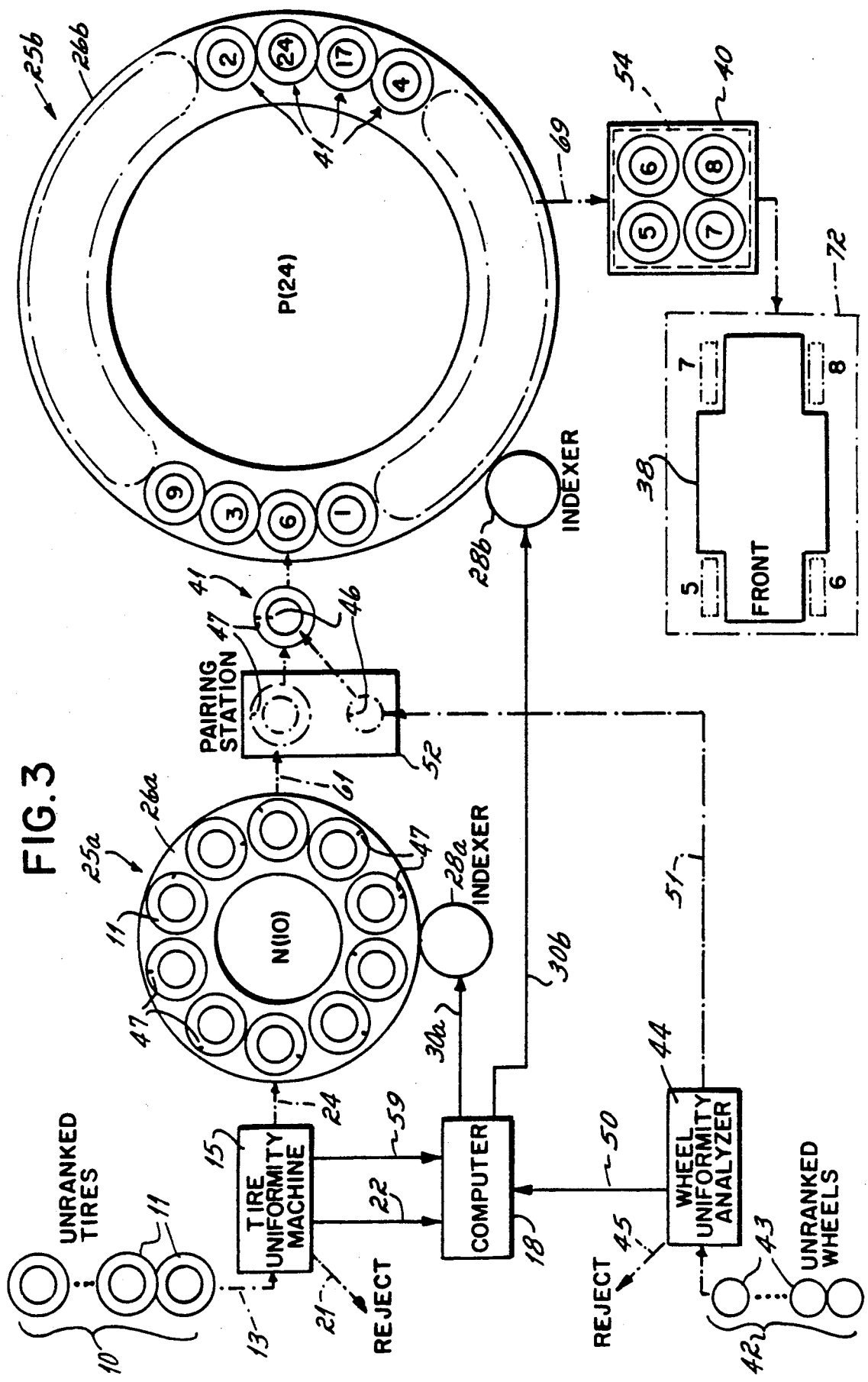
FIG. 3 is a schematic diagram illustrating a second preferred embodiment of the apparatus of the invention.

Considering FIG. 3 now in further detail, individual wheels from an unranked population 42 of wheels 43 are delivered one at a time to a wheel uniformity analyzer machine 44 which may suitably comprise a Model SSP-WUA available from Akron Standard, an ITW Company of Akron, Ohio or equivalent. Machine 44 measures the magnitude and angle of at least a wheel vibration-indicating parameter, such as the first harmonic of average radial runout at its bead seat, which is correlated to a tendency of each wheel 43 to give rise to radial vibration in tire/wheel assemblies. If desired, machine 44 can also measure other parameters of interest correlated to other dimensional nonuniformities in each wheel 43 and, as indicated at 45 can optionally be used to reject any wheels 43 in which the aforementioned wheel vibration-indicating parameter or other parameters of interest exceed predetermined reject limits.

Machine 44 identifies the particular angular location on each wheel 43 which corresponds to the angle of the measured wheel vibration-indicating parameter by imparting a visible mark 46 to each non-rejected wheel 43 at an angular location lying 180° opposite that particular angular location on wheel 43. It also communicates data indicating the magnitude of the wheel vibration-indicating parameter of each measured wheel 43 to a computer 18 by way of a signal 50. Computer 18 stores that information as a record in its memory together with corresponding records of the magnitudes of the wheel vibration-indicating parameter characterizing each of the $N-1$ non-rejected wheels 43 measured by machine 44 immediately prior to the wheel 43 most recently measured. In the manner described in the Ser. No. 07/556,951 application incorporated herein by reference, computer 18 assigns the particular wheel 43 delivered to pairing station 52 a unique one out of a successive series of wheel rank numbers ranging from 1 through N based on the measured magnitude of the wheel vibration-indicating parameter of that particular wheel 43 as compared to the magnitudes of the vibration-indicating parameter of the N−1 non-rejected wheels measured by wheel analyzing machine 44 immediately prior to the aforementioned particular wheel 43. The number N is a number selected in a manner to be described shortly.

After being measured by machine 44, each wheel 43 is conveyed by a conveyor 51 to a tire/wheel pairing station 52 whereat a tire 11 is subsequently mounted thereon in the manner described in the Ser. No. 07/556,951 application to form a tire/wheel assembly 41.

Preferably carried out concurrently with the above steps, a tire uniformity machine 15 takes up individual tires 11 one at a time from an unranked population 10 of such tires and measures at least a steering pull-indicating parameter and a tire vibration-indicating parameter characterizing each tire 11. The steering pull-indicating parameter is one or a combination of ones correlated to the tendency of each tire 11 to contribute to steering pull and may suitably comprise conicity or the possible alternatives referred to earlier in connection with the first preferred embodiment. The magnitude and algebraic sign of the steering pull-indicating parameter is communicated via a signal 57 to computer 18 which stores that magnitude and sign information in memory as a record identifiable with the particular tire 11 associated with that information. In addition to such a record for the non-rejected tire 11 most recently measured by machine 15, computer 18 also maintains corresponding records for the last P−1 non-rejected tires 11 so measured for a total of P such records in all.

P is a number determined as described earlier in connection with the embodiment of FIG. 1 and in the present embodiment preferably equals twenty-four (24). The number N, while not necessarily being approximately equal the number P, may be suitably selected to be equal to about twenty-five (25) with twenty-four (24) being presently preferred for passenger car tire applications. However, for convenience of illustration and to emphasize that N and P are not necessarily the same, FIG. 3 shows N as being equal to ten (N(10)) and P being set at its presently preferred value of twenty-four (P(24)).

Substantially concurrently with the measurement of the pull-indicating parameter, machine 15 also measures the aforementioned tire vibration-indicating parameter which is a parameter correlated to the tendency of each tire 11 to generate vibration in a particular direction such as the radial direction. Such tire vibration-indicating parameter, which may suitably comprise the magnitude of the first harmonic of radial force variation, is communicated to computer 18 by a signal 59. Machine 15 also includes means for measuring and indicating the angle of this parameter. This can readily be accomplished by equipping machine 15 with conventional marking means for making a visible mark 47 at the angular location on tire 11 corresponding to the angle of said parameter. Once the magnitude of the tire vibration-indicating parameter of a tire 11 has been measured, computer 18 stores that information in memory as a record identifiable with the particular tire 11 associated with that information. In addition to maintaining such a record for the tire 11 most recently tested by machine 15, computer 18 also maintains corresponding records of the magnitude of the tire vibration-indicating parameter characterizing the last N−1 non-rejected tires.

After being tested and marked by machine 15, each tire 11 is conveyed as indicated at 24 to a rotary table 26a until a group or queue 25a consisting of the aforementioned number N of tires 11 is accumulated thereon. In order to facilitate the loading and off-loading of rotary table 26a as well as to permit computer 18 to track the positions of each particular tire 11 located thereon, computer 18 controls the angular orientation of rotary table 26 using an indexer 28a driven by a signal 30a in the manner described earlier with reference to the embodiment of FIG. 1.

As described in further detail in the Ser. No. 07/556,951 application, computer 18 assigns each tire 11 present in queue 25a a unique tire vibration rank designation such as a tire vibration rank number ranging from 1−N. To do so, computer 18 sorts the stored records of the N tires physically present in the queue 25a on rotary table 26a using as keys the magnitudes of the vibration-indicating parameters associated with each respective tire 11. Based on the outcome of the sorting, computer 18 assigns each tire 11 a tire vibration rank number in accordance with the magnitude of its aforementioned tire vibration-indicating parameter relative to the magnitudes of the tire vibration-indicating parameter as measured for the last N−1 non-rejected tires previously measured by machine 15 and delivered to rotary table 26a.

Once those tire vibration rank designations have been assigned, computer 18 selects the particular tire 11 from queue 25a whose tire vibration rank designation matches the wheel vibration rank designation assigned by computer 18 to the wheel 43 then present at pairing station 52. Computer 18 then generates a signal 30 appropriate to cause indexer 28 to rotate the particular tire 11 just mentioned to an angular location from which it can be transferred to off-loading conveyor 61 energized in response to a separate signal (not shown) which is also generated by computer 18. At pairing station 52, that particular tire 11 is mated with the wheel 43 then present at pairing station 52 so as to form a tire/wheel assembly 41. The tire 11 and wheel 43 making up each tire/wheel assembly 41 are mutually oriented such that their respective marks 47 and 46 are in angular alignment as shown so as to form a tire/wheel assembly 41 exhibiting a reduced tendency to vibrate radially. That tire/wheel assembly 41 is then transferred via a conveyor 63 to an identifiable location on a second rotary table 26b.

The aforementioned operations continue until rotary table 26b accumulates a queue 25b consisting of a total of P tires. The number P is selected in the manner described earlier with reference to the embodiment of FIG. 1 and, in the present embodiment may also suitably comprise a number equal to or about equal to twenty-four (24).

Once a full complement of P tire/wheel assemblies 41 is accumulated on rotary table 26b, computer 18 assigns each tire 11 associated therewith a unique one out of a series of P pull rank numbers based on their respective steering pull-indicating parameter measurements in a manner analogous to that explained previously with reference to the embodiment of FIGS. 1 and 2.

In accordance with the invention, computer 18 then selects from the group of P tire/wheel assemblies 41 accumulated in the queue 25b present on rotary table 26b at least one set of tire/wheel assemblies having pull rank numbers which are at least substantially consecutive and which are preferably consecutive such as: [1, 2, 3, 4], [5, 6, 7, 8] or [21, 22, 23, 24] where the pairs of brackets define the pull rank numbers of the tire/wheel assemblies 41 present in a given set 54. By generating a series of appropriate signals 30b, computer 18 then causes an indexer 28b mechanically coupled to rotary table 26b to sequentially rotate rotary table 26b to position each tire/wheel assembly 41 making up the selected set at an off-loading conveyor 29. Upon being energized by an additional signal (not shown) generated by computer 18, conveyor 69 removes each tire/wheel assembly 41 in the selected set 54 from rotary table 26b. The selected tire/wheel assemblies may thereafter be mounted upon a vehicle 38 as illustrated. Where the vehicles 38 upon which the sets 54 of tire/wheel assemblies 41 are to be mounted are located at a location 72 remote from that at which the above process is carried out, the tire/wheel assemblies 41 may be loaded onto a pallet or other suitable container 40 for transportation and/or storage while maintaining the integrity of each selected set 54.

After a set 54 of four or other desired number of tire/wheel assemblies 41 is removed from queue 25b, the resulting vacancies on rotary table 26b are filled with new tire/wheel assemblies as they are completed at pairing station 52. In like manner, the tire vacancies created on rotary table 26a when individual tires 11 are removed therefrom and transported to pairing station 52 are promptly filled with tires 11 just measured by machine 15. In this way, the invention permits continuous operation whereby individual tires 11 and wheels 43 may be continuously taken up measuring by machines 15 and 44, respectively, while appropriately selected sets 54 of tire/wheel assemblies 41 are continuously delivered from rotary table 26b.

Third Preferred Embodiment

Figure 4:
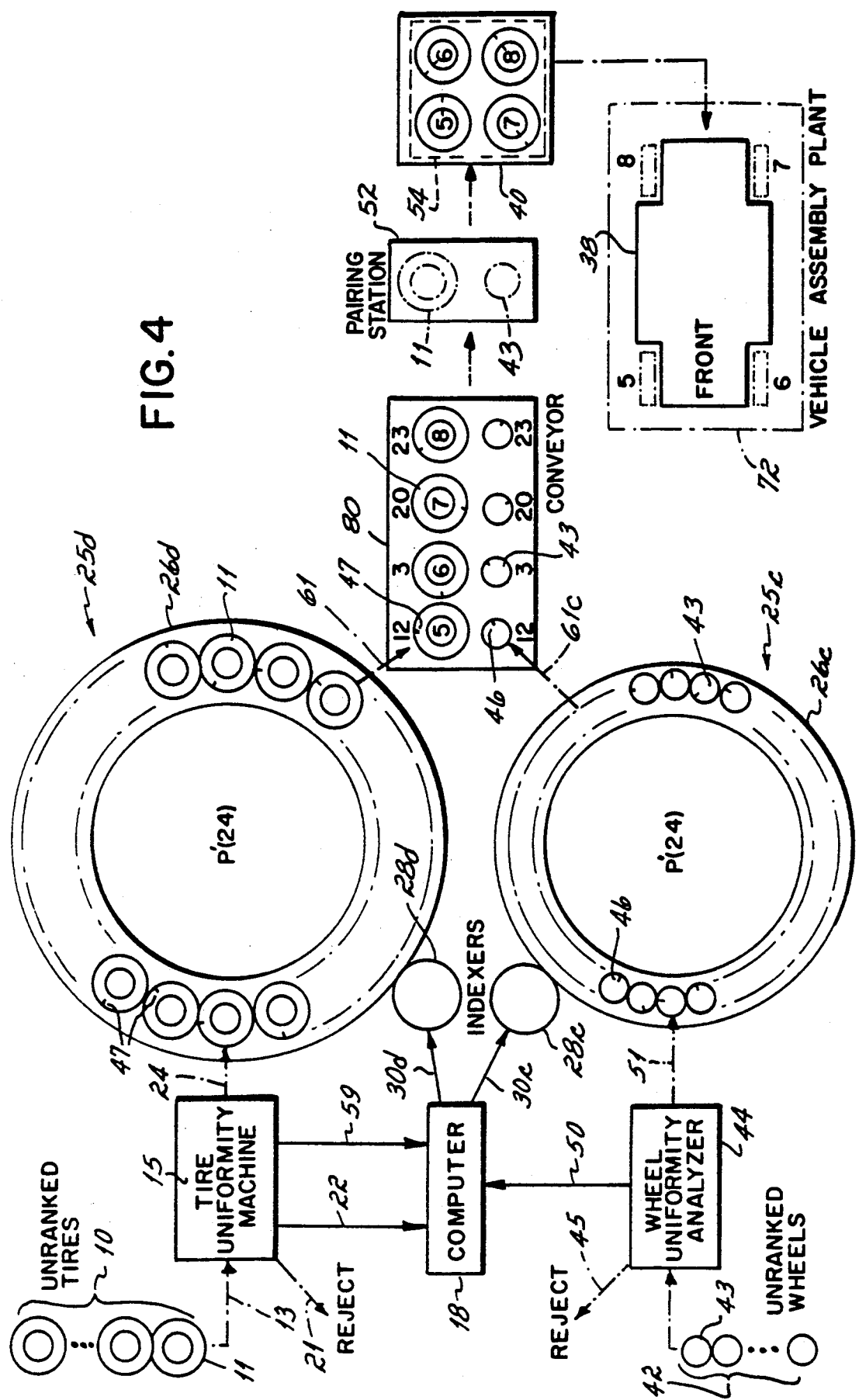
FIG. 4 is a schematic diagram illustrating a third preferred embodiment of the apparatus of the invention.

In accordance with a third preferred embodiment of the invention as illustrated in FIG. 4, tires 11 and wheels 43 are each taken up serially from respective unranked populations 10 and 42 for measuring by a tire uniformity machine 15 and a wheel uniformity analyzer 44, respectively. Wheel uniformity analyzer 44 measures the magnitude and angle of at least a wheel vibration-indicating parameter, such as the first harmonic of average radial runout of the bead seat of each wheel 43, which is correlated to a tendency of each wheel 43 to give rise to radial vibration in tire/wheel assemblies 41. If desired, machine 44 can also measure other parameters of interest correlated to nonuniformities in each wheel 43 and, as indicated at 45, reject any wheels 43 in which the aforementioned wheel vibration-indicating parameter or other parameters of interest exceed predetermined reject limits. Machine 44 then identifies the particular angular location on each wheel 43 which corresponds to the angle of the measured first parameter by imparting a visible mark 46 to each non-rejected wheel 43 in the manner described previously. Wheel uniformity analyzer 44 also communicates data indicating the magnitude of the measured first parameter to a computer 18 by way of a signal 50. Computer 18 stores that information as a record in memory together with corresponding records of the magnitudes of the wheel vibration-indicating parameters of the P'−1 non-rejected wheels 43 measured by machine 44 immediately prior to the non-rejected wheel 43 most recently measured by machine 44. The number P' is selected to equal either the number N selected in the manner described in the Ser. No. 07/556,951 application or the number P selected as described earlier, whichever of those two is the greater. Presently, selecting P' equal to twenty-four (24) is preferred.

After being so measured by machine 44, each wheel 43 is transferred via a conveyor 51 to a rotary table 26c upon which is accumulated a queue 25c containing P' non-rejected wheels 43. Rotary table 26c is rotatably driven by an indexer 28c under the control of a signal 30c generated by computer 18 in a manner analogous to the generation of the signals 30, 30a and 30b described earlier.

Preferably carried out concurrently with the above operations, individual tires 11 from population 10 are measured by tire uniformity machine 15. In the manner described with reference to the embodiment of FIG. 3, tire uniformity machine 15 measures at least a steering pull-indicating parameter and a tire vibration-indicating parameter characterizing each tire 11. As in the embodiment of FIG. 3, those measurements are communicated to computer 18 which stores records of them in memory together with corresponding records associated with the P'−1 non-rejected tires 11 and the P'−1 non-rejected wheels 43 most recently measured. Likewise, tire uniformity machine 15 marks tire 11 with a mark 47 as described previously.

After being tested and marked by machine 15, each tire 11 is carried by a conveyor 24 to a rotary table 26d upon which a queue 25d of P' tires is accumulated. Computer 18 controls the angular orientation of rotary table 26d using a mechanical indexer 28d driven by a signal 30d in the same manner rotary table 26c is positioned by indexer 28c under the control of signal 30c.

In accordance with the invention, computer 18 sorts the P' stored records of the wheel vibration-indicating parameter measurements of the P' wheels accumulated on rotary table 26c and, into a non-decreasing or non-increasing order and, in the manner described earlier, assigns each of the P' wheels present thereon a unique one out of a series of P' wheel vibration rank numbers. To assign the wheel rank numbers, computer 18 sorts the wheel vibration-indicating parameter measurements stored in its memory using their measured magnitude values as keys. Based on the outcome of that sorting, computer 18 assigns each wheel 43 a unique one of a successive series of wheel rank numbers ranging from 1 through P according to a corresponding non-decreasing or non-increasing order. In a similar fashion, computer 18 sorts the stored records of the steering pull-indicating parameter measurements associated with each of the P' tires accumulated on rotary table 26d and assigns each tire 11 thereon a unique pull rank number in the range from 1 through P' indicating its relative tendency to contribute to steering pull as compared to the remaining P'−1 tires accumulated on rotary table 26d.

Computer 18 also assigns each tire 11 a P' tire vibration rank number indicating the tendency of each of the P' tires on table 26d to cause vibration in the radial direction as compared to the remaining P'−1 tires present thereon. To do so, computer 18 sorts the records of the tire vibration-indicating parameter measurements stored in its memory into a non-decreasing or non-increasing order and then assigns a unique one of a series of P' successive tire vibration rank designations ranging from 1 through P' to each tire according to the same corresponding non-decreasing or non-increasing order. The order according to which the tires 11 on rotary table 26d are sorted should correspond to the order according to which the wheels 43 on rotary table 26c are sorted. That is, if the wheels 43 on rotary table 26d are sorted according to a non-decreasing order, a non-decreasing order should also be used for sorting the tires 11 on rotary table 26d and vice versa.

After the tires and wheels present on rotary tables 26d and 26c respectively have been ranked in the manner described above, computer 18 then proceeds to select a set of tires 11 and wheels 43 in a manner which will result in a reduction in steering pull as well as a reduction in the tendency of tire/wheel assemblies formed therefrom to generate vibration in the radial direction.

To do so, computer 18 generates a series of signals 30d appropriate to cause indexer 28d to rotate rotary table 26d so as to off load a set of at least two and preferably four tires 11 from rotary table 26d such that each tire 11 making up the selected set is sequentially positioned adjacent an off-loading conveyor 61 which is then activated by computer 18 to sequentially transfer each tire 11 in the selected set onto a linear conveyor 80. As in the previously described embodiments, the tires making up the set of tires selected by computer 18 are ones having pull rank numbers which are at least substantially consecutive and which are preferably consecutive. For example, as shown in FIG. 4, tires having pull rank numbers of [5, 6, 7, 8] may suitably be selected.

Further in accordance with the invention, computer 18 operates to select for each of the tires 11 in the aforementioned set, that particular wheel 43 from rotary table 26c whose wheel vibration rank number matches the tire vibration rank number of the tire. And by generating a series of appropriate signals 30c, computer 18 drives indexer 28c so as to cause each of those wheels to be delivered via a conveyor 61c onto linear conveyor 80 opposite or otherwise physically associated with the corresponding tire as illustrated. For purposes of illustration only, FIG. 4 shows the pull rank numbers associated with a particular selected set of tires, i.e., the set [5, 6, 7, 8], marked in the center of each tire on linear conveyor 80. Also, the tire vibration rank number for each of those same tires is indicated along each tire. The corresponding wheel vibration rank number is indicated below each wheel 43.

Once a selected set of tires 11 and their mating wheels 43 are delivered thereon in associated pairs, linear conveyor 80 is energized by computer 18 so as to deliver them to a tire/wheel pairing station 52. At tire/wheel pairing station 52, each tire 11 is mounted upon its mating wheel with marks 47 and 46 in angular alignment so as to form a set 54 of tire/wheel assemblies 41 which, when ultimately mounted and used on a vehicle 38 tend to exhibit reduced radial vibration as well as reduced steering pull. Where the vehicles 38 upon which the tire/wheel assemblies are to be mounted are located at a location 72 remote from that at which the above process is carried out, the tire/wheel assemblies 41 formed at pairing station 52 may be loaded onto a pallet or other suitable container 40 for transportation and/or storage while maintaining the integrity of each set 54.

SPECIFYING A STEERING PULL-INDICATING PARAMETER

Prior to implementing any of the embodiments of the invention which have just been described, it is necessary to specify an appropriate steering pull-indicating parameter to be measured by tire uniformity machine 15. In doing so, improved performance of the invention can be expected by taking into account the characteristics of the particular vehicle 38 upon which sets 12 of tires 11 selected in accordance with the invention will be used. The objective is to select as the steering pull-indicating parameter a measurable parameter of tires (or tire/wheel assemblies) or numerically weighted combination of measurable parameters of tires (or tire/wheel assemblies) having a high correlation to the tendency of a particular vehicle 38 to exhibit steering pull under expected driving conditions.

One way of achieving this objective is to measure each tire in a representative sample lot of tires for two or more parameters expected to be correlated to steering pull. A series of driving tests is then performed using the sample tires to measure actual steering pull values. The parameter measurements and steering pull measurements are then analyzed to determine the appropriate numerical weighting coefficients to be applied to each component steering pull-indicating parameter so as to specify a composite steering pull-indicating parameter consisting of the sum of the weighted component parameters. Machine 15 is then programmed to measure each of the component parameters and determine the magnitude and algebraic sign of the composite steering pull-indicating parameter for each tire 11 measured in any of the foregoing embodiments. This technique will now be described in further detail.

Figure 5:
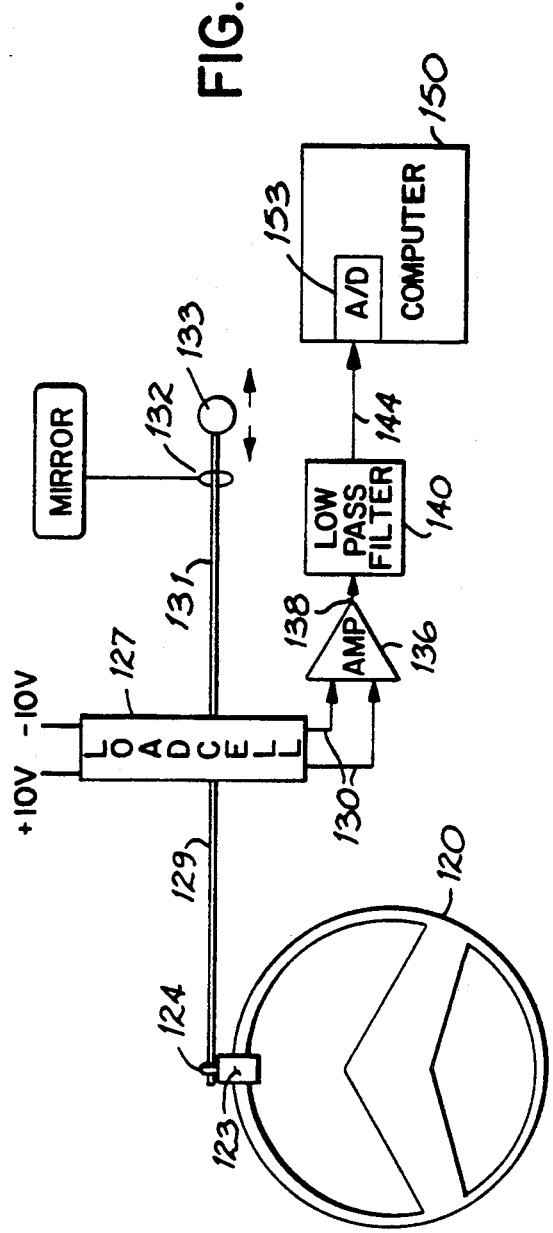
FIG. 5 is a schematic diagram illustrating a system for measuring steering pull.

A test vehicle, which is preferably of the same type and model upon which the tires 11 will ultimately be driven, is instrumented as illustrated in FIG. 5 in order to measure steering pull under actual driving conditions. Referring now to FIG. 5, the steering wheel 120 of the vehicle is outfitted with a clamp 123 having a ball swivel joint 124 which connects the steering wheel 120 to one side of a loadcell 127 by way of a first rigid rod 129. Loadcell 127 may suitably comprise a fifty (50) pound rated type such as a LEBOW 3397 available from Eaton Corp. of Troy, Mich. or equivalent. Loadcell 127 generates a 2 mV/pound double-ended output signal 130 when provided with +/−10 Volt excitation as illustrated. The opposite side of loadcell 127 is connected to a second rigid rod 131 having at its free end a knob of a size to facilitate comfortable grasping by a driver. A support 132, which may suitably comprise a wire suspended from the rear-view mirror of the test vehicle, maintains knob 133 at an approximately fixed vertical level so as to permit the test vehicle to be steered by moving knob 133 back and forth horizontally as indicated in FIG. 5.

The output signal 130 generated by loadcell 127 is applied to an instrumentation amplifier 136 whose gain is selected to be about 1000X or otherwise as appropriate to provide a full scale output at a force applied to loadcell 127 which is only somewhat higher than the forces to be registered during the taking of data. In the preferred system, a four pound force applied to loadcell 127 produces a five volt signal 133 at the output of amplifier 136. Signal 138 is filtered by a four-pole Butterworth low pass filter 140 in order to generate a conditioned signal 144 which is sampled at the rate of one hundred (100) samples/second by a computer 150 having an analog-to-digital converter (A/D) 153 installed therein. A/D converter 153 may suitably comprise a 12-bit Model DT-2814 available from Data Translation of Marlboro, Mass. or equivalent, while computer 150 may comprise a Model 320 laptop computer available from Dell Computer Corp. of Austin, Tex. or equivalent. A commercial spreadsheet software program such as EXCEL available from Microsoft Corp. of Redmond, Wash. or equivalent suitable for carrying out multiple linear regression analysis is installed in computer 150 for a purpose to be explained hereinafter.

Because crosswinds on the test vehicle can introduce error in measuring steering pull data should be taken when winds are less than about five (5) miles per hour or steps should be taken to cancel wind effects from steering pull measurements. By measuring the wind velocity apparent to the test vehicle while steering pull measurements are being made, the error introduced due to the wind can be determined by repeating steering pull measurements using the same tires under differing wind conditions.

A suitable measure of apparent wind velocity can be obtained by mounting an anemometer, such as one supplied as part of the WEATHER MASTER weather station available from Digitar of Haywood, Calif. or equivalent on the test vehicle. The anemometer should be mounted about 18–24 inches in front of the test vehicle, aligned with the lateral centerline of the vehicle and with its vertical centerline even with the centroid of the projected side area of the vehicle. The suggested anemometer provides one contact closure per revolution of its wind sensing cups and a variable resistance to ground proportional to apparent wind direction. As such, the anemometer may readily be interfaced with computer 150 for developing measurements of apparent wind speed and direction. In order to provide correction of steering pull data, computer 150 subtracts from each steering pull measurement a wind correction quantity equal to the average wind speed multiplied by the sine of the average wind direction multiplied by a calibration constant.

The calibration constant is determined by driving the test vehicle, equipped with the same tires during the entire calibration procedure, under conditions of varying winds and recording the wind speed, wind direction and steering pull for each of a number of measurement intervals. Care should be taken that a combination of prevailing wind direction and road crowns does not introduce an error into the calibration. Taking relatively equal numbers of measurements in the left and right lanes of interstate highways or conducting the tests on the uncrowned center of a closed test facility will eliminate this potential source of error. To calculate the calibration constant, a linear regression is then performed, using the average wind speed multiplied by the sine of the average wind direction as the independent variable and the steering pull as the dependent variable. Computer 150 then stores the calibration constant for use in calculating the wind correction quantity just described. In usage, wind correction quantity is determined simultaneously with the steering pull data for tires under test and is subtracted from the average steering pull determined during the test.

Where the vehicles 38 upon which tires 11 are ultimately intended for use is a front wheel drive type, the steering pull-indicating parameter measured by machine 15 may comprise for example a composite parameter, $\hat{y}$, which can be represented as follows:

$$\hat{y} = [m1^* \text{ Conicity} + m2^* \text{ RPK}] + b \qquad \text{EQUATION 1}$$

where: Conicity and RPK are the values of these parameters for a given tire 11 as measured by machine 15, b is a constant and m1 and m2 are numerical weighting factors. Factors m1 and m2 can be determined in a manner which will now be explained using a test vehicle instrumented in the manner described above for measuring steering pull with correction for wind effects where necessary. This test vehicle should be of the same type (i.e., front-wheel drive versus rear-wheel drive) and preferably of the same model as the vehicles 38 upon which tires 11 are intended for end use.

A sample lot of tires 11 representative of those to be processed according to the invention is first selected. Where the intended implementation of the invention is one, such as those of embodiments of FIGS. 3 or 4, which contemplates the mating of tires 11 with wheels 43 to form specially paired tire/wheel assemblies 41, representative tire/wheel assemblies rather than tires alone are selected. On the other hand, where the intended implementation is one like that of the embodiment of FIG. 1, in which no particular individual wheels are paired with the sets 12 of tires 11 to be selected using the invention, the sample lot of tires are preferably mounted on wheels which, as nearly as practicable, are representative of those upon which the tires 11 will ultimately be mounted for use on vehicles 38. The size of the sample lot may vary somewhat depending on variability of manufacture but a sample lot size of twelve has been found sufficient in at least one case and will be used as the basis for the remainder of this description.

Of the twelve tires, two are marked "left rear" and "right rear" while the remaining ten are marked with numbers 1–10 for identification purposes. The conicity and RPK of each tire is then measured using test equipment representative of the machine 15 to be used in connection with the invention. Those conicity and RPK values are then recorded for use in a manner to be explained later.

Utilizing random numbers, a test design is then developed in which each of the ten front tire/wheel assemblies is mounted on the left front position of the vehicle in conjunction with each of the remaining nine front assemblies, without any assembly being used in two consecutive tests. This will result in a test design including ninety separate tests. One suitable such test design is set forth in FIG. 6.

For each of the ninety tests, P01–P90, the inflation pressure of the tires is adjusted to the vehicle manufacturer's specifications. For all ninety tests, the tires designated "left rear" and "right rear" remain mounted in those respective positions on the test vehicle. For each test, the two tires specified by the test design of FIG. 6 are then mounted on the left front and right front of the test vehicle and the vehicle is driven in order to measure steering pull using the instrumentation described above. The test vehicle is also advantageously equipped with automatic speed control in order to allow the test driver to concentrate on directional control during the test rather than speed control.

The test driving is preferably performed in three segments arranged such that the second segment is driven in the opposite direction from the first and third segments. The steering pull measuring portion of each segment should be approximately one mile long and conducted along straight sections of road or track. All tests should be conducted at a uniform speed representative of highway speed, such as 60 MPH. A reasonable tire warm-up drive of about two to three miles should precede the first segment of each test. After tire warm-up, computer 150 is instructed to commence data acquisition by sampling and storing a digital representation of signal 144 once every 10 milliseconds. The initial portion of the first test segment is performed with the driver steering the test vehicle by means of the steering wheel 120 in the normal fashion while the test vehicle is driven in a first direction. After ten seconds of such driving, computer 150 sounds an audible alarm alerting the driver to begin steering the vehicle using knob 133 to effect motion of the steering wheel 120. When steering using knob 133, the steering wheel 120 itself should not be touched by the driver or otherwise interfered with. This permits loadcell 127 to accurately register the force which must be exerted at the perimeter of steering wheel 120 in order to keep the test vehicle traveling straight ahead along a straight portion of the test track. Approximately ten seconds or so should be allowed for the driver to safely affect the transition from steering the test vehicle via steering wheel 120 to steering it using knob 133. After the test vehicle has been driven for approximately one mile using knob 133, computer 150 terminates data acquisition and records a test result for the first segment of the test. The first segment test result is calculated by computer 150 as the average of the data acquired during the time the test vehicle was being driven via knob 133 minus the average of the data acquired during the ten seconds during which the vehicle was being steered normally using steering wheel 120. This compensates for any DC drift in the test system. Computer 150 stores the first segment test result.

Using the same tires, a second segment of each test is driven in the manner described above except with the test vehicle travelling in the opposite direction. A result for this second segment of the test is determined in the same manner as the result of the first segment and is also stored by computer 150.

The third segment of the test is driven in the same direction as and is otherwise identical to the first segment of the test. The result of the third segment is calculated in a manner identical to the calculation of the results of the first and second segments and is also recorded by computer 150. After the results of all three segments are available, the overall result of each test is then determined.

To determine the overall test result, computer 150 adds the results of the first and third segments to twice the result of the second segment and divides the sum by four. Since the first and third segments are each driven in the same direction as one another and in the opposite direction from the second segment of the test, the result from the second segment of the test is counted twice in the foregoing sum. This weighting tends to cancel wind effects as well as to minimize further tire warm-up effects. The overall test result is then recorded by computer 150 to complete one test. The front tires of the test vehicle are then removed and exchanged with the next set indicated by the test design of FIG. 6 and the next test is conducted in the same manner as described. Testing continues until all ninety tests have been completed.

Subsequent to making any necessary corrections for wind effects, the data gathered during the test is then analyzed by computer 50 in a manner which will now be described.

The results of the ninety individual tests is organized into a 10×10 row/column array as illustrated in FIG. 7. The row index corresponds to the identification number of the tire on the left front of the vehicle and the column index corresponds to the tire on the right front for each given test. Since the same tire cannot simultaneously be mounted on both sides of the test car during the same test, the principle diagonal of the array is empty. From the array, a series of row averages (RAvg), $RA_1$-$RA_{10}$, are computed as are a series of column averages (CAvg), $CA_1$-$CA_{10}$. A so-called grand average (GAvg), is then computed as the arithmetic average of the results of all ninety tests. Each column average is the simple arithmetic average of the results of nine tests with a given one of tires 1-10 mounted on the right front of the vehicle when paired with each of the other tires mounted on the left front. This represents the deviation from grand average, less the steering contribution which would have occurred had that given tire been mounted on the left front side of the vehicle. Likewise, each row average is the average of the results of nine tests with a given tire mounted on the left front of the vehicle paired with all of the remaining tires mounted on the right front of the vehicle. This represents the deviation from the grand average, less the steering pull contribution which would have occurred had the given tire been mounted on the right front.

It can be shown mathematically that the steering pull contributed by the ith tire used on the front of the test vehicle in the ninety, tests is:

$$(81 * RAvg_i + 9 * CAvg_i - 90 * GAvg_i)/80, \qquad \text{EQUATION 2}$$

and the contribution made when the given tire is on the right front is:

$$(81 * CAvg_i + 9 * RAvg_i - 90 * GAvg_i)/80. \qquad \text{EQUATION 3}$$

These contributions can be combined into a "conicity-like" component, $P_i$, as:

$$P_i = (\text{left\_front\_contribution}_i - \text{right\_front\_contribution}_i)/2, \qquad \text{EQUATION 4}$$

and a "plysteer-like" component, $Q_i$, as $$Q_i = (\text{left\_front\_contribution}_i + \text{right\_front\_contribution}_i)/2. \qquad \text{EQUATION 5}$$

The "plysteer-like" component is much smaller than the "conicity-like" component and can be ignored.

The "conicity-like" components values, $P_i$, defined by Equation 4 are then computed for each of the i=10 tires tested on the front of the test vehicle. Those ten values are then used as dependent variables in carrying out a multiple linear regression in which the measured conicity and RPK values for each tire are used as the independent variables. For example, using the aforementioned Microsoft EXCEL software program run on computer 150, a spreadsheet as illustrated in FIG. 8 is created. The "conicity-like" component values, $P_i$, determined as explained above are entered into cells A2 through A11 while the previously recorded conicity measurements, $C_i$, and RPK measurements $R_i$ are entered into cells B2 through B11 and C2 through C11, respectively. Then, selecting cells E2 through E6 the following formula is entered:

$$\hat{y} = LINEST (C2..C11, A2...B11, TRUE, TRUE) \quad \text{EQUATION 6}$$

The Ctrl+Shift+Enter keys of computer 150 are actuated in order to enter EQUATION 6 as an array formula into the entire range. The program then calculates the constant, b, and the coefficients m1 and m2 in the multiple linear regression expressed by EQUATION 1 placing the constant term, b, in cell G2, the coefficient m1 in cell F2 and the coefficient m2 into cell E4. The other cells in the range E2..G6 are filled with additional statistics explained in the Microsoft EXCEL Function Reference Manual.

Once m1 and m2 have been determined, the tire uniformity machine 15 used in any of the preceding embodiments of the invention may be programmed to measure both the conicity and RPK value of each tire 11 and to compute the value of a composite steering pull-indicating parameter $\hat{y}$ according to EQUATION 1. The values of that steering pull-indicating parameter may then be used as keys for sorting the tires in the manner described in detail above. It will be appreciated that the outcome of the sorting will not be affected if the constant term, b, in EQUATION 1 is deleted. Its use therefore is optional.

While the apparatus and methods described herein constitute preferred embodiments of the present invention, it is to be understood that the invention is not limited thereby and that in light of the present disclosure, various alternative embodiments will be apparent to persons skilled in the art. Accordingly, it is to be recognized that changes can be made without departing from the scope of the invention as particularly pointed out and distinctly claims in the claims set forth below including all legal equivalents thereof.

What is claimed is:

1. A process for selecting a set of tires for use of an individual vehicle to reduce steering pull, said process comprising the steps of:
   (a) ranking a group of tires into a consecutive order according to at least the magnitude of a specified parameter measured using at least one machine, said parameter being correlated to the tendency of each tire in said group to contribute to steering pull; and
   (b) selecting from said group a set of at least two substantially consecutively ranked tires.

2. The process of claim 1 wherein said ranking step comprises the steps of:
   (i) generating parameter measurements by determining at least said magnitude of said parameter for each said tire in said group;
   (ii) ordering said tires in said group according to said parameter measurements; and
   (iii) based on the outcome of said ordering, assigning each tire in said group a corresponding rank designation selected from a consecutive series of different rank designations spanning a finite rank designation range.

3. The process of claim 2 wherein in carrying out said selecting step, each selection is made from a region of said rank designation range which is at least partially offset from a different region of said range from which an immediately preceding selection was made.

4. The process of claim 1 wherein said parameter comprises conicity.

5. The process of claim 1 wherein said group of tires consists of a finite number, P, of tires where P is sufficiently large to ensure to a desired degree of probability that substantially consecutively ranked tires will vary as to their respective tendencies to contribute to steering pull by no more than a desired limit.

6. A process for selecting sets of tires for use on individual vehicles to reduce steering pull, said process comprising the steps of:
   (a) using at least one machine, measuring individual tires for at least the magnitude of a parameter correlated to a tendency of each respective individual tire to contribute to steering pull;
   (b) accumulating a group of said tires;
   (c) ordering the tires in said group non-increasingly or non-decreasingly by their respective parameter measurements and assigning each tire in said group, based on the outcome of said ordering, a corresponding, unique rank designation from a consecutive series of such rank designations; and
   (d) selecting from said group a set of tires whose respective rank designations are substantially consecutive according to said series.

7. The process of claim 6 wherein each said set comprises at least two (2) tires.

8. The process of claim 6 wherein each said set consists of four (4) tires.

9. The process of claim 6 further comprising the steps of:
   (e) removing said selected set from said group;
   (f) repeating steps (a) and (b) until said group is restored to a predetermined number of tires; then
   (g) repeating steps (c) through (f) at least once.

10. The process of claim 9 wherein each said set is selected such that the rank designations of the tires in each said set are at least partially offset according to said series from the rank designations of an immediately previously selected set.

11. The process of claim 6 wherein said parameter comprises conicity.

12. The process of claim 6 wherein said parameter comprises a combination of revolutions per unit distance and conicity.

13. The process of claim 6 wherein said group of tires consists of a finite number, P, of tires where P is sufficiently large to ensure to a desired degree of probability that substantially consecutively ranked tires will vary as to their respective tendencies to contribute to steering pull by no more than a desired limit.

14. A set of tires selected from a population of tires for use on an individual vehicle so as to reduce steering pull, said set being selected from said population according to a process comprising the steps of:
   (a) ranking a group of tires into a consecutive order according to at least the magnitude of a specified parameter measured using at least one machine, said parameter being correlated to the tendency of each tire in said group to contribute to steering pull; and
   (b) selecting from said group a set of at least two substantially consecutively ranked tires.

15. The set of tires of claim 14 wherein said ranking step comprises the steps of:

(i) generating parameter measurements by determining at least said magnitude of said parameter for each said tire in said group;
(ii) ordering said tires in said group according to said parameter measurements; and
(iii) based on the outcome of said ordering, assigning each tire in said group a corresponding rank designation selected from a consecutive series of different rank designations spanning a finite rank designation range.

16. The set of tires of claim 14 wherein said parameter comprises conicity.

17. The set of tires of claim 14 wherein said parameter comprises a combination of revolutions per unit distance and conicity.

18. The set of tires of claim 14 wherein said group of tires consists of a finite number, P, of tires where P is sufficiently large to ensure to a desired degree of probability that substantially consecutively ranked tires will vary as to their respective tendencies to contribute to steering pull by no more than a desired limit.

19. A set of tires selected from a population of tires for use on an individual vehicle so as to reduce steering pull, said set being selected from said population according to a process comprising the steps of:
(a) using at least one machine, measuring individual tires for at least the magnitude of a parameter correlated to a tendency of each respective individual tire to contribute to steering pull;
(b) accumulating a group of said tires;
(c) ordering the tires in said group non-increasingly or non-decreasingly by their respective parameter measurements and assigning each tire in said group based on the outcome of said ordering a corresponding, unique rank designation from a consecutive series of such rank designations; and
(d) selecting from said group a set of tires whose respective rank designations are substantially consecutive according to said series.

20. The set of tires of claim 19 wherein each said set comprises at least two (2) tires.

21. The set of tires of claim 19 wherein each said set consists of four (4) tires.

22. The set of tires of claim 19 further comprising the steps of:
(e) removing said selected set from said group;
(f) repeating steps (a) and (b) until said group is restored to a predetermined number of tires; then
(g) repeating steps (c) through (f) at least once.

23. The set of tires of claim 22 wherein each said set is selected such that the rank designations of the tires in each said set are at least partially offset according to said series from the rank designations of an immediately previously selected set.

24. The set of tires of claim 19 wherein said parameter comprises conicity.

25. The set of tires of claim 19 wherein said parameter comprises a combination of revoluations per unit distance and conicity.

26. The set of tires of claim 19 wherein said group of tires consists of a finite number, P, of tires where P is sufficiently large to ensure to a desired degree of probability that substantially consecutively ranked tires will vary as to their respective tendencies to contribute to steering pull by no more than a desired limit.

27. An apparatus for selecting a set of tires for use on an individual vehicle to reduce steering pull, said apparatus comprising:

(a) a machine for making measurements of a parameter correlated to the tendency of individual tires to contribute to steering pull;
(b) ranking means for ranking a group of said individual tires into a consecutive order according to at least said magnitudes; and
(c) selecting means for selecting from said group a set of at least two substantially consecutively ranked tires.

28. The apparatus of claim 27 wherein said parameter comprises conicity.

29. The apparatus of claim 27 wherein said parameter comprises a combination of revolutions per unit distance and conicity.

30. The apparatus of claim 27 wherein said group of tires consists of a finite number, P, of tires where P is sufficiently large to ensure to a desired degree of probability that substantially consecutively ranked tires will vary as to their respective tendencies to contribute to steering pull by no more than a desired limit.

31. The apparatus of claim 27 wherein each said set consists of four (4) tires.

32. An apparatus for selecting a set of tires for use on an individual vehicle to reduce steering pull, said apparatus comprising:
(a) a machine for making measurements of a parameter correlated to a tendency of individual tires to contribute to steering pull;
(b) an accumulator for storing a group of said tires measured by said machine; and
(c) a computer, including a memory, for:
(i) storing said measurements of said parameter for each of said tires in said group;
(ii) ordering said measurements according to a predetermined consecutive order; and
(iii) selecting a set of at least two (2) tires whose respective measurements are substantially consecutively ordered.

33. The apparatus of claim 32 wherein said parameter comprises conicity.

34. The apparatus of claim 32 wherein said parameter comprises a combination of revolutions per unit distance and conicity.

35. A process of making tire/wheel assemblies and selecting sets of same for use on individual vehicle, said process comprising the steps of:
(a) measuring individual tires to determine for each one the values of at least (i) a tire vibration-indicating parameter correlated to the tendency thereof to cause vibration in a given direction, and (ii) a steering pull-indicating parameter;
(b) assigning said individual tires both a tire vibration rank designation and a pull rank designation based upon said values of said tire vibration-indicating parameter and said pull-indicating parameter respectively;
(c) measuring individual wheels to determine for each one, the value of a wheel vibration-indicating parameter correlated to the tendency thereof to cause vibration in said direction;
(d) forming tire/wheel assemblies from ones of said measured tires and wheels whose respective tire vibration rank designations and wheel vibration rank designations each bear a corresponding relationship to one another; and
(e) selecting at least one set of at least two of said tire/wheel assemblies whose tires have pull rank designations bearing a substantially consecutive relationship to each other.

36. An apparatus for pairing tires and wheels from which tire/wheel assemblies are to be formed and for identifying sets of such tire/wheel assemblies for use ion individual vehicles, said apparatus comprising:
   (a) tire measuring means for measuring individual tires to determine for each one the values of at least (i) a tire vibration-indicating parameter correlated to the tendency thereof to cause vibration in a given direction, and (ii) a steering pull-indicating parameter;
   (b) wheel measuring means for measuring individual wheels to determine for each one, the value of a wheel vibration-indicating parameter correlated to the tendency thereof to cause vibration in said direction; and
   (c) computer means for:
      (i) assigning said individual tires both a tire vibration rank designation and a pull rank designation based upon said values of said tire vibration-indicating parameter and said pull-indicating parameter respectively;
      (ii) identifying particular ones of said tires and wheels whose respective tire vibration rank designations and wheel vibration rank designations bear a corresponding relationship to one another as pairs from which tire/wheel assemblies are to be formed; and
      (iii) identifying as a set intended for use on the same vehicle, at least two tires whose respective pull rank designations bear a substantially consecutive relationship to one another.

37. A process for pairing tires and wheels to reduce vibration of tire/wheel assemblies made therefrom and for selecting sets of said assemblies for use on individual vehicles to reduce steering pull, said process comprising the steps of:
   (a) based on the magnitude of a parameter measured using at least one machine, assigning each wheel in a group of wheels a wheel vibration rank designation from a series of wheel rank designations, each said wheel vibration rank designation indicating the relative tendency of a given said wheel to cause vibration in a given direction when used in a tire/wheel assembly as compared to the other wheels in said group of wheels;
   (b) assigning a tire a tire vibration rank designation from a series of tire vibration rank designations, each said tire vibration rank designation in said series of tire vibration rank designations corresponding to a respective wheel vibration rank designations, said assigned tire vibration rank designation indicating the relative tendency of said tire to cause vibration in said given direction when used in a tire/wheel assembly as compared to a plurality of other tires from said population of tires;
   (c) pairing said tire with that particular wheel from among said group of wheels having a wheel vibration rank designation which corresponds to the tire vibration rank designation of said tire and forming a tire/wheel assembly from said particular tire and said particular wheel;
   (d) repeating steps (a) through (c) to form a group of tire/wheel assemblies;
   (e) assigning individual tire/wheel assemblies in said group of tire/wheel assemblies, ones of a consecutive series of pull rank designations according to the tendencies of the tires making up said individual tire/wheel assemblies in said group to contribute to steering pull as compared to one another; and
   (f) selecting from said group of tire/wheel assemblies at least one set of tire/wheel assemblies whose tires have pull rank designations which are at least substantially consecutive.

38. A process for pairing tires and wheels to reduce vibration in tire/wheel assemblies made therefrom and for selecting sets of said assemblies for use on individual vehicles to reduce steering pull, said process comprising the steps of:
   (a) assigning each tire in a group of tires, based on the magnitude of a parameter measured using at least one machine, a tire vibration rank designation from a series of tire vibration rank designations, each said tire vibration rank designation indicating the relative tendency of a given said tire to cause vibration in a given direction when used in a tire/wheel assembly as compared to the other tires in said group of tires;
   (b) assigning a wheel from a population of wheels a wheel vibration rank designation from a series of wheel vibration rank designations, each said wheel vibration rank designation in said series of wheel vibration rank designations corresponding to a respective one of said tire vibration rank designations in said series of tire vibration rank designations, said assigned wheel vibration rank designation indicating the relative tendency of said wheel to cause vibration in said given direction when used in a tire/wheel assembly as compared to a plurality of other wheels from said population of wheels;
   (c) pairing said wheel with that particular tire from said group of tires having a tire vibration rank designation which corresponds to the wheel vibration rank of said wheel and forming a tire/wheel assembly from said wheel and said particular tire;
   (d) repeating steps (a) through (c) to form a group of tire/wheel assemblies;
   (e) assigning individual tire/wheel assemblies in said group of tire/wheel assemblies, ones of a consecutive series of pull rank designations according to the tendencies of the tires making up said individual tire/wheel assemblies in said group to contribute to steering pull as compared to one another; and
   (f) selecting from said group of tire/wheel assemblies at least one set of tire/wheel assemblies whose tires pull rank designations which are at least substantially consecutive.

39. A set of tire/wheel assemblies made and selected according to the process of:
   (a) measuring individual tires to determine for each one the values of at least (i) a tire vibration-indicating parameter correlated to the tendency thereof to cause vibration in a given direction, and (ii) a steering pull-indicating parameter;
   (b) assigning said individual tires both a tire vibration rank designation and a pull rank designation based upon said values of said tire vibration-indicating parameter and said pull-indicating parameter respectively;
   (c) measuring individual wheels to determine for each one, the value of a wheel vibration-indicating parameter correlated to the tendency thereof to cause vibration in said direction;

(d) forming tire/wheel assemblies from ones of said measured tires and wheels whose respective tire vibration rank designations and wheel vibration rank designations each bear a corresponding relationship to one another; and (e) selecting for use on a given vehicle at least one set of at least two of said tire/wheel assemblies whose tires have pull rank designations bearing a substantially consecutive relationship to each other.

* * * * *